US008430185B2

(12) United States Patent
Uemura

(10) Patent No.: US 8,430,185 B2
(45) Date of Patent: Apr. 30, 2013

(54) IMPACT TORQUE ADJUSTING DEVICE OF HYDRAULIC TORQUE WRENCH

(75) Inventor: Yoji Uemura, Osaka (JP)

(73) Assignee: Uryu Seisaku Ltd., Osaka (JP)

( * ) Notice: Subject to any disclaimer, the term of this patent is extended or adjusted under 35 U.S.C. 154(b) by 450 days.

(21) Appl. No.: 12/232,076

(22) Filed: Sep. 10, 2008

(65) Prior Publication Data

US 2009/0065229 A1 Mar. 12, 2009

(30) Foreign Application Priority Data

Sep. 11, 2007 (JP) ................................ 2007-235595
Jan. 21, 2008 (JP) ................................ 2008-010268

(51) Int. Cl.
*B23Q 5/033* (2006.01)

(52) U.S. Cl.
USPC ....................... 173/178; 173/176; 137/625.65

(58) Field of Classification Search ................. 173/93.5, 173/176, 178; 137/625.65; 464/25
See application file for complete search history.

(56) References Cited

U.S. PATENT DOCUMENTS

| | | | | | |
|---|---|---|---|---|---|
| 3,214,940 | A | * | 11/1965 | Kramer | 464/25 |
| 3,283,537 | A | * | 11/1966 | Gillis | 464/25 |
| 3,814,133 | A | * | 6/1974 | Veh | 137/625.65 |
| 4,418,764 | A | * | 12/1983 | Mizobe | 173/177 |
| 4,553,948 | A | * | 11/1985 | Tatsuno | 464/25 |
| 4,785,693 | A | * | 11/1988 | Minamiyama et al. | 81/465 |
| 4,838,133 | A | * | 6/1989 | Dainin | 81/465 |
| 5,080,181 | A | * | 1/1992 | Tatsuno | 173/93.5 |
| 6,334,494 | B1 | * | 1/2002 | Nagato | 173/93.5 |
| 7,703,546 | B2 | * | 4/2010 | Kettner | 173/93 |
| 2004/0079425 | A1 | * | 4/2004 | Rub | 137/625.65 |

FOREIGN PATENT DOCUMENTS

| | | | |
|---|---|---|---|
| JP | 2002066946 A | * | 3/2002 |

* cited by examiner

*Primary Examiner* — M. Alexandra Elve
*Assistant Examiner* — Nathaniel Chukwurah
(74) *Attorney, Agent, or Firm* — Wenderoth, Lind & Ponack, L.L.P.

(57) ABSTRACT

An impact torque adjusting device is constructed by forming an operating fluid channel 11*b* communicating through the inside of a liner 7 which becomes a high-pressure chamber H and a low-pressure chamber L at the time impact torque is generated. In the operating fluid channel 11*b*, a valve disc 11*d* is urged in the direction opening the operating fluid channel 11*b*. Behind the valve disc 11*d*, an oil chamber 11*e* communicates with the inside of the liner 7 which becomes a high-pressure chamber H at the time impact torque is generated, so that the operating fluid channel 11*b* may be narrowed in proportion to the increase of the operating fluid.

3 Claims, 7 Drawing Sheets

IMPACT TORQUE ADJUSTING DEVICE OF HYDRAULIC TORQUE WRENCH

BACKGROUND OF THE INVENTION

The present invention concerns an impact torque adjusting device of a hydraulic torque wrench.

Conventionally, a hydraulic torque wrench using, as a hydraulic impact torque generator of the torque wrench, a hydraulic impact torque generator with little noise and vibration has been developed and put to practical use (see Laid-open Utility Model Application No. H3-40076 and Laid-open Patent Application No. H6-297349, for example).

FIG. 6 and FIG. 7 show an example of such a hydraulic torque wrench. Here, the hydraulic torque wrench 1 comprises a main valve 2 for supplying and stopping high-pressure air, and a normal-reverse turn switching valve 3 for selectively generating impact torque of normal and reverse turns, so as to drive a rotor 4 for generating rotational torque with high-pressure air fed through those two valves 2, 3. A hydraulic impact torque generator 5 for converting the rotational torque of the rotor 4 into impact torque is provided in the case 6 of the hydraulic torque wrench 1.

The hydraulic impact torque generator 5 is constructed by charging and sealing an operating fluid in a cavity formed in a liner 7 turned by the rotor 4, providing two blade insertion grooves (there are also cases with one only or a plurality no less than 3) in a spindle 8 placed coaxially in the liner 7, inserting a blade 9 in the blade insertion grooves, and urging the blade 9 constantly in the outer circumferential direction of the spindle 8 with a spring 10 so that it may be in contact with the inner circumferential face of the liner 7.

Moreover, on the hydraulic impact torque generator 5 is disposed an output adjusting mechanism 11 to enable adjustment of the amount of the impact torque to be generated.

And, by rotatably driving the liner 7 with the rotor 4, it becomes possible to generate an impact torque on the spindle 8, to tighten or loosen a nut, etc. fastened to the tip of the spindle 8, when a plurality of sealed faces formed on the inner circumferential face of the liner 7, the sealed face formed on the inner circumferential face of the spindle 8 and the blade 9 agree with one another.

By the way, in a conventional hydraulic torque wrench, the output adjusting mechanism 11 for adjusting the amount of the impact torque to be generated is constructed in a way to discharge its function, by adjusting the size of the operating fluid channel communicating through the liner 7 which becomes a high-pressure chamber and a low-pressure chamber at the time impact torque is generated, with an operation of the operating shaft. The amount of the impact torque becomes smaller if the operating fluid channel is widened with an operation of the operating shaft to the opening side and, conversely, the amount of the impact torque becomes larger if the operating fluid channel is narrowed with an operation of the operating shaft to the closing side.

However, the size of the operating fluid channel adjusted with operations of the operating shaft remains constant (fixed) during an operation of the hydraulic torque wrench, and this presents the following problems (1)~(4):

(1) A large error (difference) between the amount of the actually generated impact torque and the set impact torque.

(2) An unusually high impact torque is liable to be generated at the time of starting of the tightening motion (at seating of the tightening member).

(3) A large resistance after the generation of impact torque (after the generation of pulse), and long impact torque generating period.

(4) Poor durability due to a load pressure which is liable to be exerted on the sealed part.

SUMMARY OF THE INVENTION

The objective of the present invention, realized in view of the above-described problems of conventional hydraulic torque wrenches, is to provide an impact torque adjusting device of a hydraulic torque wrench capable of maintaining high accuracy of the amount of impact torque generated by the impact torque generator of the hydraulic torque wrench, shortening the impact torque generating period, and improving durability of the impact torque generator of the hydraulic torque wrench.

To achieve this objective, the impact torque adjusting device of hydraulic torque wrench according to the present invention is an impact torque adjusting device of a hydraulic torque wrench comprising a liner to be turned by a rotor, a spindle disposed inside the liner, and a blade. The device forms an operating fluid channel communicating through the liner which becomes a high-pressure chamber and a low-pressure chamber at the time impact torque is generated. In the operating fluid channel, a valve disc is urged in the direction opening the operating fluid channel. Behind the valve disc, an oil chamber communicates with the inside of the liner which becomes a high-pressure chamber at the time impact torque is generated, in a way to narrow the operating fluid channel as the operating fluid pressure in the high-pressure chamber goes up.

In this case, the valve disc may be incorporated in the output adjusting mechanism for adjusting the amount of the impact torque.

Furthermore, it is possible to dispose two valve discs in a way to face opposite to each other across the operating fluid channel, so that the two valve discs may move in a way to narrow the operating fluid channel.

According to the impact torque adjusting device of the hydraulic torque wrench of the present invention, by forming an operating fluid channel communicating through the liner which becomes a high-pressure chamber and a low-pressure chamber at the time impact torque is generated, disposing, in the operating fluid channel, a valve disc urged in a direction opening the operating fluid channel and forming, behind the valve disc, an oil chamber communicating with the inside of the liner which becomes a high-pressure chamber at the time impact torque is generated, in a way to narrow the operating fluid channel as the pressure of the operating fluid in the high-pressure chamber goes up, it becomes possible to maintain high accuracy of the amount of impact torque generated by the impact torque generator of hydraulic torque wrench, shorten the impact torque generating period, and also improve durability of the impact torque generator of hydraulic torque wrench.

Still more, by incorporating the valve disc in the output adjusting mechanism for adjusting the amount of the impact torque, it becomes possible to simplify the construction of the impact torque adjusting device.

Yet more, by disposing two valve discs in a way to face opposite to each other across the operating fluid channel, so that the two valve discs may move in a way to narrow the operating fluid channel, it becomes possible to reduce the moving stroke of the valve discs when moving them for adjusting the size of the operating fluid channel. Thus, response performance and accuracy of the amount of impact torque are improved.

DETAILED DESCRIPTION OF THE INVENTION

Embodiments of the impact torque adjusting device of a hydraulic torque wrench according to the present invention will be explained below, based on the associated drawings.

Figure 1:
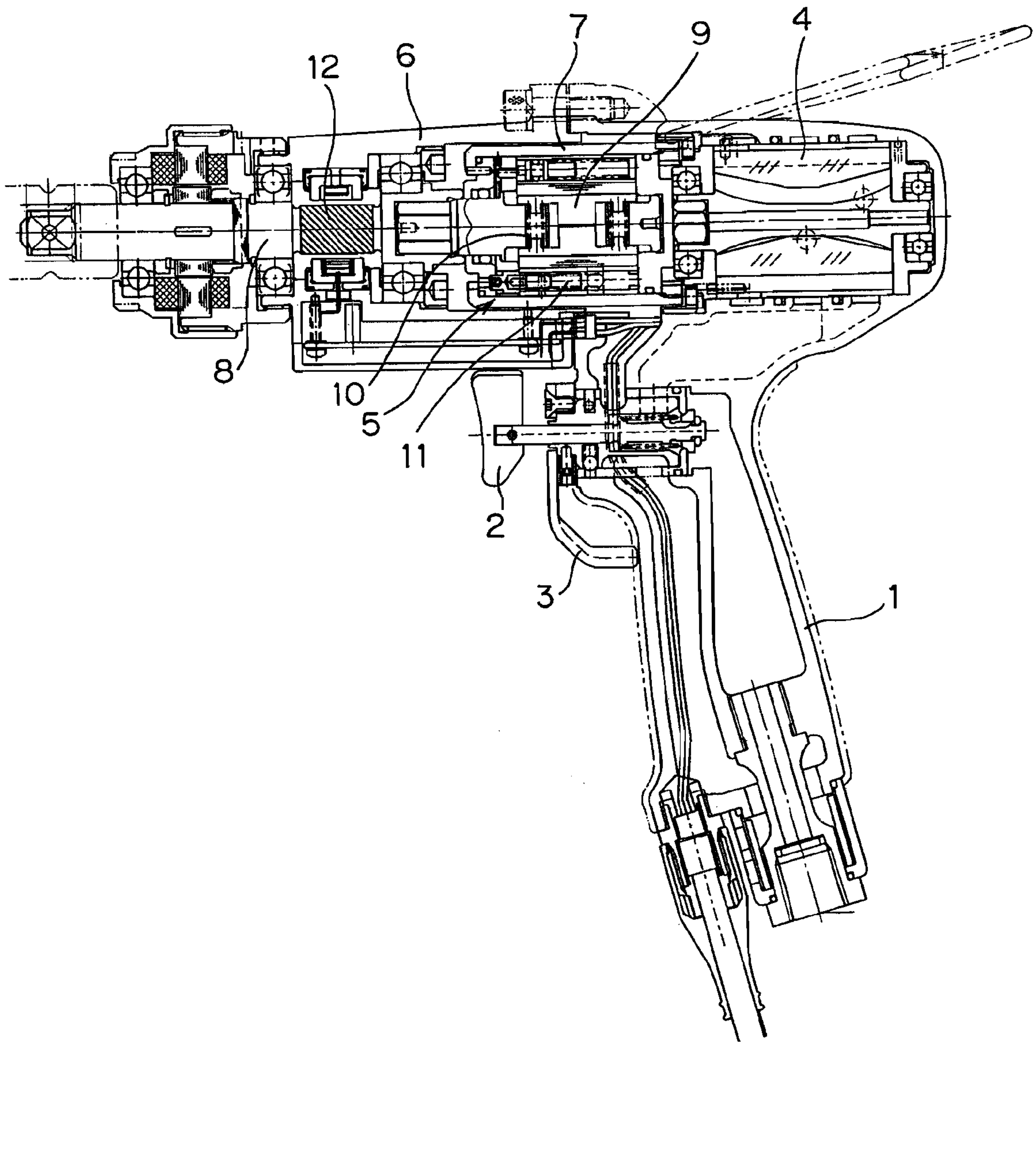
FIG. 1 is a front sectional view showing the first embodiment of the impact torque adjusting device of a hydraulic torque wrench according to the present invention.
Figure 2:
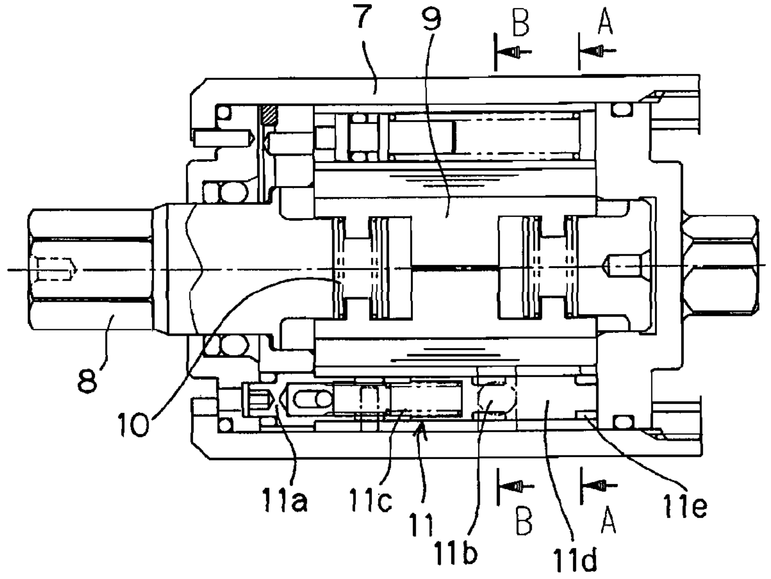
FIG. 2 is a sectional view showing the first embodiment, (a) being a front sectional view of a main part at the start of a tightening motion, (b) a front sectional view of main part during progress of tightening motion, (c) a sectional view A-A in (a), and (d) being a sectional view B-B in (a).
Figure 2:
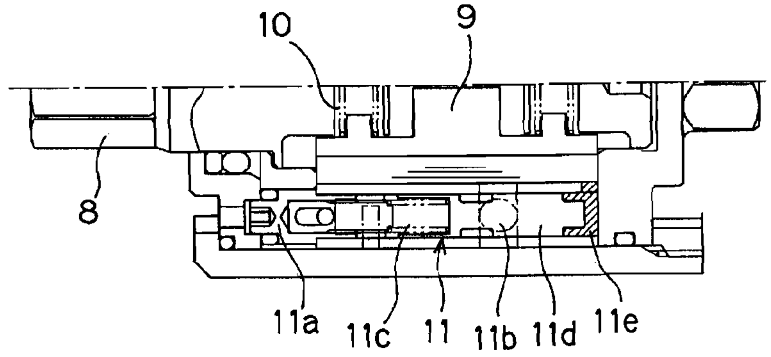
Figure 2:
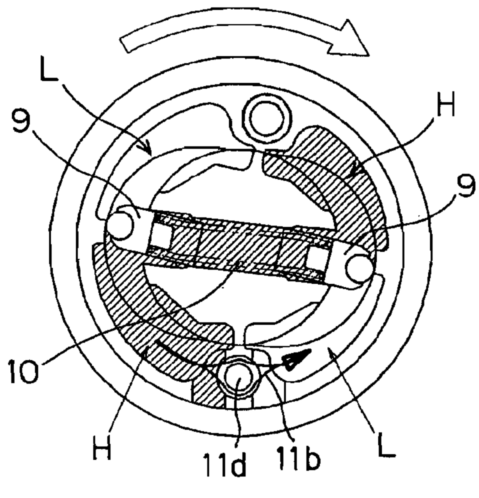
Figure 2:
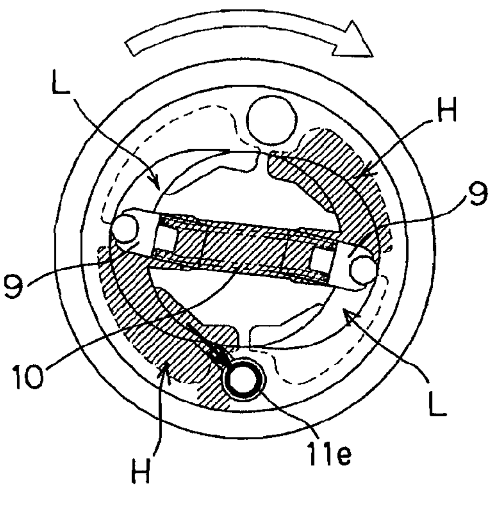

FIG. 1 and FIG. 2 show the first embodiments of the impact torque adjusting device of a hydraulic torque wrench according to the present invention.

The hydraulic torque wrench 1 of this embodiment is provided with a magnetostriction type torque detecting mechanism 12, in the same way as the conventional hydraulic torque wrench disclosed in the patent literature 2, so as to control the driving of the rotor 4, etc. with the output of this magnetostriction type torque detecting mechanism 12. The wrench 1 includes a main valve 2 for supplying and stopping high-pressure air, and a normal-reverse turn switching valve 3 for selectively generating impact torque of normal and reverse turns, so as to drive a rotor 4 for generating rotational torque with high-pressure air fed through those two valves 2, 3. A hydraulic impact torque generator 5 converts the rotational torque of the rotor 4 into impact torque, and is provided in the casing 6 of the hydraulic torque wrench 1.

The hydraulic impact torque generator 5 is constructed by charging and sealing an operating fluid in a cavity formed in a liner 7 turned by the rotor 4, providing two blade insertion grooves (there are also cases of one only or a plurality no less than 3 grooves) in a spindle 8 placed coaxially in the liner 7, inserting a blade 9 in the blade insertion grooves, and urging the blade 9 constantly in the outer circumferential direction of the spindle 8 with a spring 10 so that the blade 9 may be in contact with the inner circumferential face of the liner 7.

Moreover, on the hydraulic impact torque generator 5 is disposed an output adjusting mechanism 11 which enables adjustment of the amount of the impact torque to be generated.

And, by rotatably driving the liner 7 with the rotor 4, it becomes possible to generate an impact torque on the spindle 8, and to tighten or loosen a nut, etc. fastened to the tip of the spindle 8, when a plurality of sealed faces formed on the inner circumferential face of the liner 7, the sealed face formed on the inner circumferential face of the spindle 8, and the blade 9 agree with one another.

In the hydraulic torque wrench of this embodiment, the output adjusting mechanism 11 for adjusting the amount of the impact torque to be generated is constructed in a way to perform its function by adjusting the size of the operating fluid channel 11*b* communicating through the liner 7 which becomes a high-pressure chamber H and a low-pressure chamber L at the time impact torque is generated, with an operation of the operating shaft 11*a*. The amount of the impact torque becomes smaller if the operating fluid channel 11*b* is widened (not throttled) with an operation of the operating shaft 11*a* to the opening side. Conversely, the amount of the impact torque becomes larger if the operating fluid channel 11*b* is narrowed (throttled) with an operation of the operating shaft 11*a* to the closing side).

Furthermore, this output adjusting mechanism 11 has, in a bore communicating with the operating fluid channel 11*b*, a valve disc (cylindrical valve member) 11*d* urged in the direction for opening the operating fluid channel 11*b* through an operating shaft 11*a* and a spring 11*c*. As illustrated in FIGS. 2(*a*) and 2(*b*), the operating fluid channel 11*b* extends laterally from the bore of liner 7 in which the valve member 11*d* is slidably arranged. Behind the valve disc (valve member) 11*d*, an oil chamber 11*e* is formed to communicate with the inside of the liner 7 which becomes a high-pressure chamber H at the time impact torque is generated so that, as the pressure of the operating fluid in the high-pressure chamber H goes up with a progress of the tightening motion, the operating fluid channel 11*b* may be narrowed (throttled), as shown in FIG. 2 (*a*) to FIG. 2 (*b*) with this increase of the operating fluid pressure in the high-pressure chamber H due to the sliding movement of the valve member through the bore.

This makes it possible to maintain high accuracy of the amount of impact torque generated by the impact torque generator of the hydraulic torque wrench, shorten the impact torque generating period, and also improve durability of the impact torque generator of hydraulic torque wrench.

Figure 3:
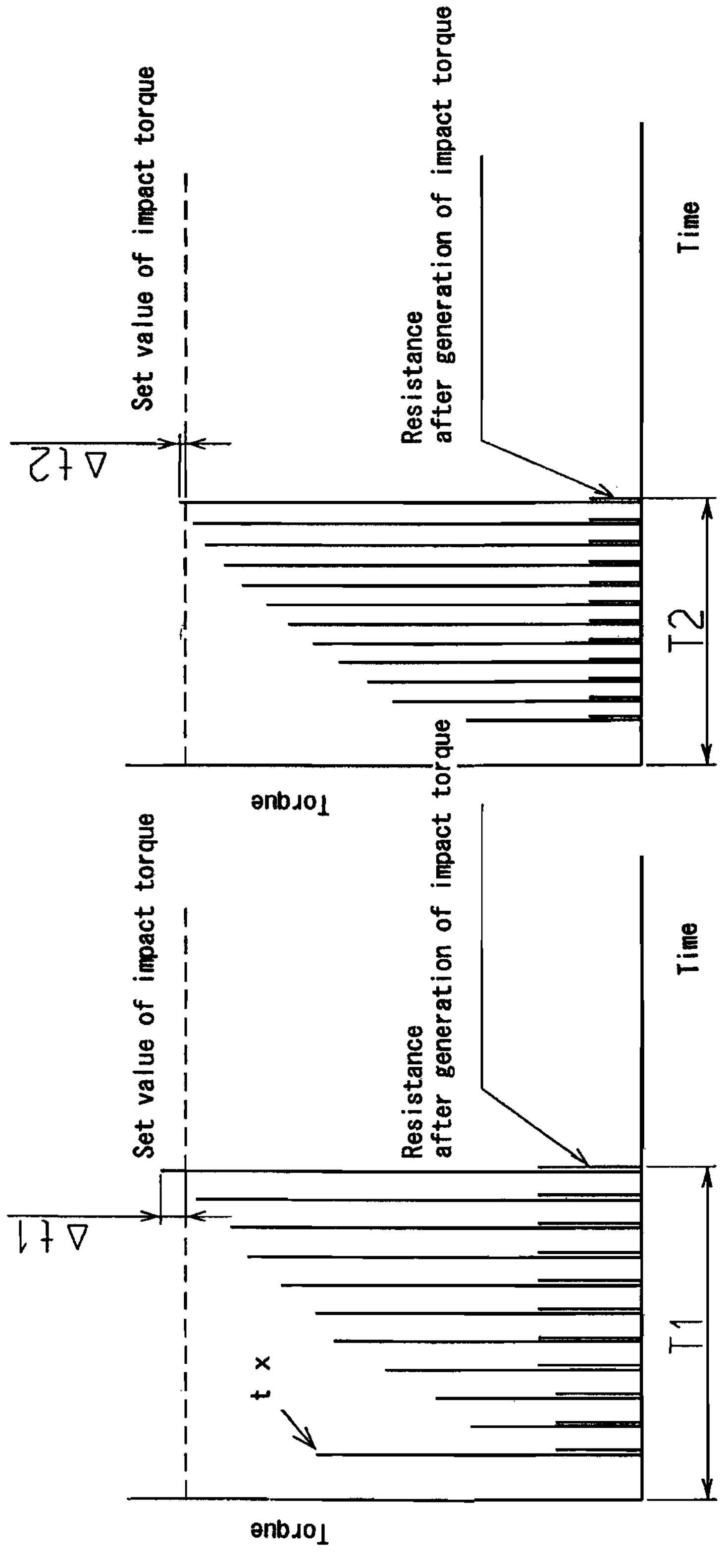
FIG. 3 is an output characteristic chart, (a) showing the case of a conventional example (the size of the operating fluid channel remains constant (fixed) during an operation of the hydraulic torque wrench), and (b) showing the case of the first embodiment, respectively.

The above-mentioned effects and advantages may be explained with reference to the output characteristic charts shown in FIG. 3. FIG. 3 (*a*) shows the case of a conventional example (the size of the operating fluid channel remains constant (fixed) during an operation of the hydraulic torque wrench), while FIG. 3 (*b*) indicates the case of this embodiment, respectively, as follows.

(1) Because the pressure of the operating fluid inside the liner 7, which becomes a high-pressure chamber H depending on the state of tightening, can be controlled accurately, this improves accuracy of the amount of impact torque, by reducing the error (difference) between the amount of the actually generated impact torque and the set impact torque to a level expressed in comparison with that of the conventional example as $\Delta t1$ (conventional)>$\Delta t2$ (this embodiment).

(2) No unusually high impact torque tx as that of the conventional example is generated, because the operating fluid channel 11*b* increases at the time of starting of the tightening motion (at seating of the tightening member).

(3) The operating fluid channel 11*b* is widened (not throttled) after the generation of impact torque (after the generation of pulse). This reduces the resistance after the generation of impact torque (after the generation of pulse) and shortens the impact torque generating period to a level expressed in comparison with that of the conventional example as T1 (conventional)>T2 (this embodiment).

(4) Because the pressure of the operating fluid inside the liner 7, which becomes a high-pressure chamber H depending on the state of tightening, can be controlled accurately, this improves the durability of the hydraulic impact torque generator 5 by preventing application of load pressure on the sealed part unlike the conventional example.

Figure 4:
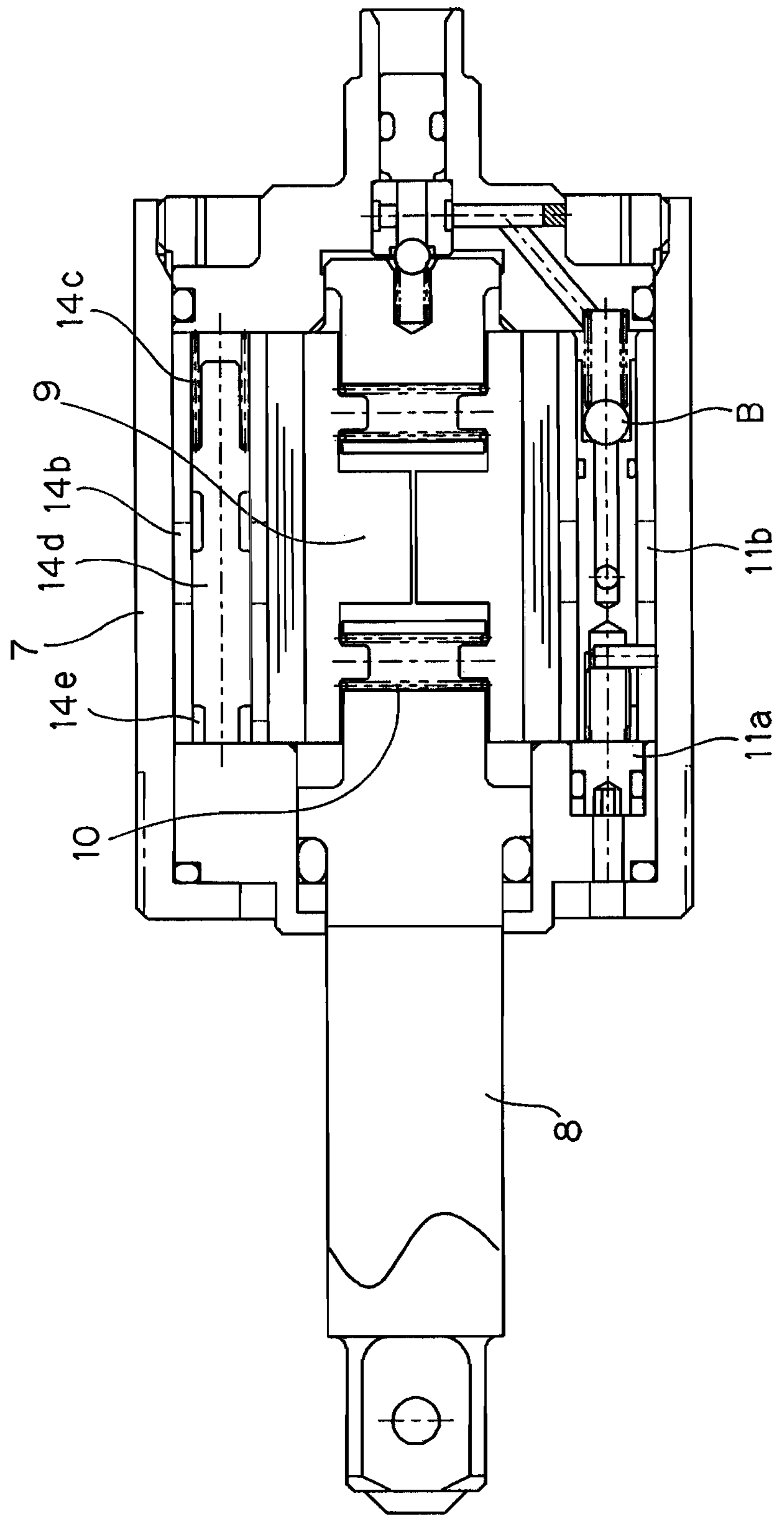
FIG. 4 is a front sectional view showing the second embodiment of the impact torque adjusting device of a hydraulic torque wrench according to the present invention.

FIG. 4 shows the second embodiment of the impact torque adjusting device of a hydraulic torque wrench according to the present invention.

Figure 7:
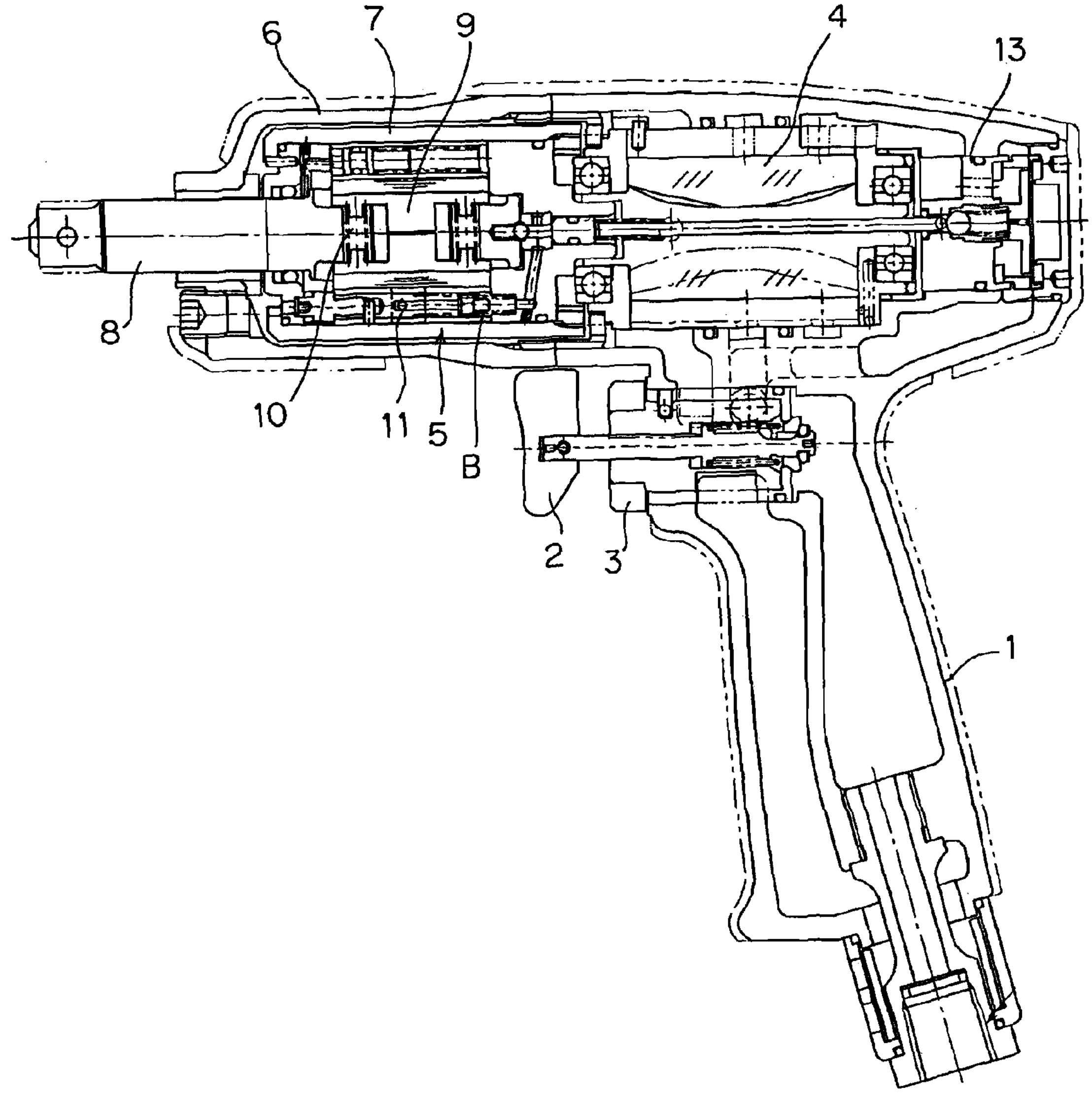
FIG. 7 PRIOR ART
FIG. 7 is a general front sectional view showing a conventional impact torque adjusting device of hydraulic torque wrench.

The hydraulic torque wrench 1 of this embodiment is designed to control the driving of the rotor 4, etc., by disposing a relief valve B on the output adjusting mechanism 11, in the same way as with the conventional hydraulic torque wrench disclosed in the patent literature 1 or FIG. 7. The pressure of the operating fluid is transferred to a shut-off mechanism 13 by opening the relief valve B when the pressure (impact torque) of the operating fluid in the high-pressure chamber H reaches the set level, instead of performing this control with the output of a torque detecting mechanism such as magnetostriction type torque detecting mechanism 12 in said first embodiment, etc.

In the case of a hydraulic torque wrench 1 of this system, the valve disc (valve member) 11*d* cannot be incorporated in the output adjusting mechanism 11. For that reason, a valve disc (valve member) 14*d* is disposed on the liner 7 separately from the output adjusting mechanism 11.

The valve disc 14*d* is urged in the direction opening the operating fluid channel 14*b* through a spring 14*c*. Behind the valve disc 14*d*, an oil chamber 14*e* is formed to communicate with the inside of the liner 7 which becomes a high-pressure chamber H at the time impact torque is generated, in a way to narrow (throttle) the operating fluid channel 14*b*, if the pressure of the operating fluid in the high-pressure chamber H goes up with a progress of the tightening motion, in proportion to the increase of the operating fluid pressure in this high-pressure chamber H.

The action of the impact torque adjusting device of hydraulic torque wrench of this embodiment is identical to that of the impact torque adjusting device of hydraulic torque wrench of the first embodiment described earlier.

Figure 5A:
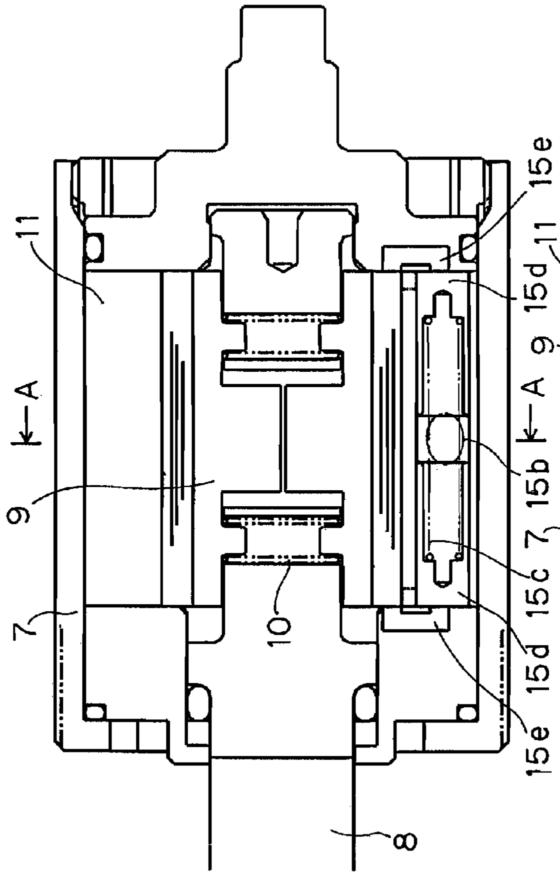
FIG. 5 shows the third embodiment of the impact torque adjusting device of a hydraulic torque wrench according to the present invention, (a) being a front sectional view of a main part at the start of the tightening motion, (b) being a front sectional view of a main part during progress of the tightening motion, and (c) being a sectional view A-A in (a).
Figure 5B:
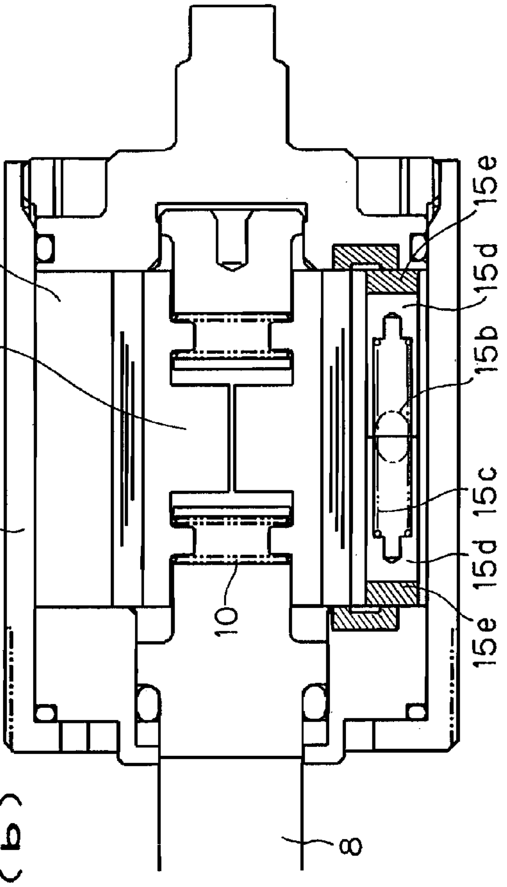
Figure 5C:
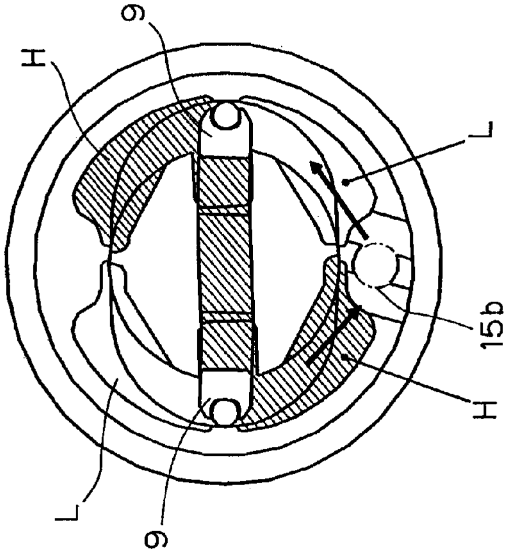
Figure 6:
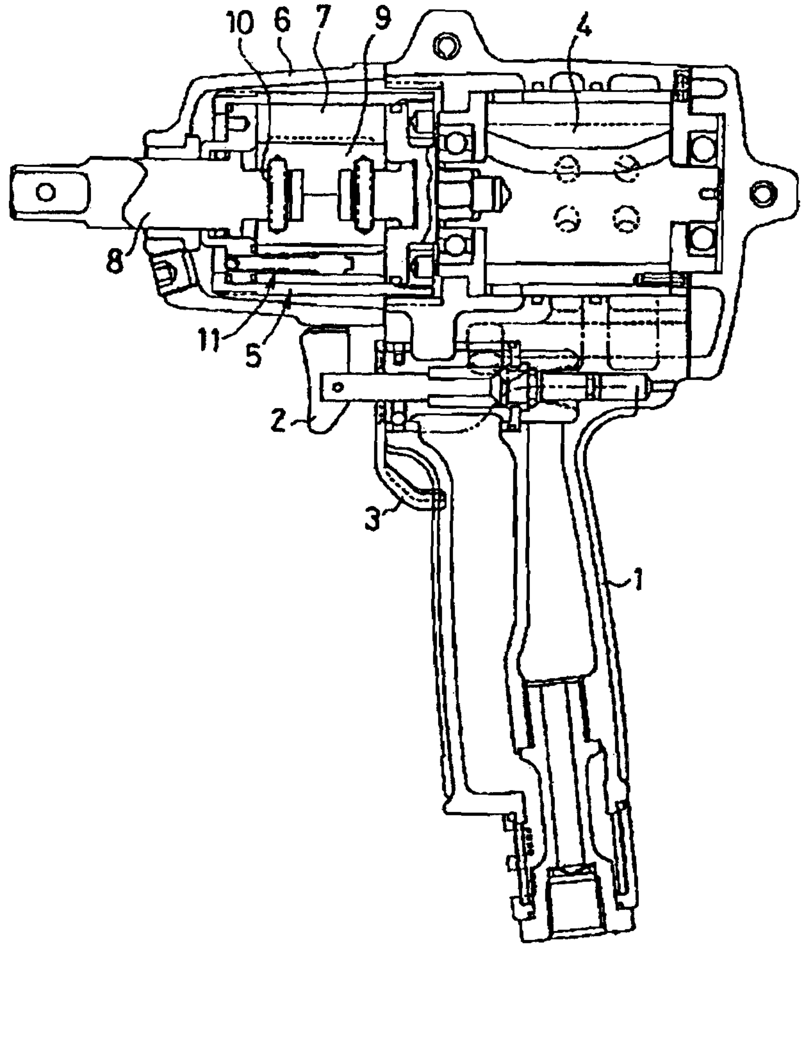
FIG. 6 PRIOR ART
FIG. 6 is a general front sectional view showing a conventional impact torque adjusting device of hydraulic torque wrench.

FIG. 5 shows the third embodiment of the impact torque adjusting device of hydraulic torque wrench according to the present invention.

The hydraulic torque wrench 1 of this embodiment is provided with a relief valve disposed on the output adjusting mechanism 11 (see FIG. 4 for details), in the same way as in the second embodiment, to control the operating fluid pressure by transferring the operating fluid pressure to a shut-off mechanism 13 (see FIG. 7) by opening the relief valve when the pressure (impact torque) of the operating fluid in the high-pressure chamber H reached the set level with a progress of the tightening motion.

In the case of a hydraulic torque wrench 1 of this system, no valve disc can be incorporated in the output adjusting mechanism 11. For that reason, a valve disc 15*d* is disposed on the liner 7, separately from the output adjusting mechanism 11.

The valve disc 15*d*, composed of two valve discs 15*d* disposed in a way to face opposite to each other across an operating fluid channel 15*b*, is urged in the direction opening the operating fluid channel 15*b* through a spring 15*c*.

Behind the respective valve discs 15 is formed an oil chamber 15*e* communicating with the inside of the liner 7 which becomes a high-pressure chamber H at the time impact torque is generated. If the pressure of the operating fluid pressure in the high-pressure chamber H goes up with a progress of the tightening motion, the respective valve discs 15 shift in the direction in which they come closer to each other, to narrow (throttle) the operating fluid channel 15*b* in proportion to the increase of the operating fluid pressure in this high-pressure chamber H.

The action of the impact torque adjusting device of hydraulic torque wrench of this embodiment is identical to that of the impact torque adjusting device of the hydraulic torque wrench of the first and second embodiments described earlier. However, by disposing two valve discs 15*d* in a way to face opposite to each other across an operating fluid channel 15*b*, and making them shift in the direction narrowing (throttling) the operating fluid channel 15*b* in proportion to the increase of the operating fluid pressure in the high-pressure chamber H, it becomes possible to reduce the moving stroke of the valve discs 15*d* when moving them to adjust the size of the operating fluid channel 15*b*, thereby improving their response performances and further improving the accuracy of the amount of the impact torque.

So far, the impact torque adjusting device of the hydraulic torque wrench according to the present invention has been explained based on a plurality of embodiments. However, the present invention is not restricted to the constructions described in the above-mentioned embodiments, and its constructions may be changed as required within the extent not deviating from its essential purpose, such as disposing the output adjusting mechanism 11 and the valve discs 11*d*, 14*d*, 15*d* on the lid portion of the liner 7 instead of the cylinder portion, etc.

The impact torque adjusting device of the hydraulic torque wrench according to the present invention, capable of maintaining high accuracy of the amount of the impact torque generated by the impact torque generator of hydraulic torque wrench, shortening the impact torque generating period, and improving durability of the impact torque generator of a hydraulic torque wrench, can be used suitably in applications of a hydraulic torque wrench using a hydraulic impact torque generator.

The invention claimed is:

1. An impact torque adjusting device of a hydraulic torque wrench, comprising:

a liner to be turned by a rotor, said liner having a bore and an operating fluid channel extending laterally from and communicating with said bore, said operating fluid channel forming a high pressure chamber and a low pressure chamber during generation of an impact torque;

a spindle inside said liner;

a blade inside said liner;

a cylindrical first valve member slidably arranged in said bore; and a cylindrical second valve member slidably arranged in said bore, said first valve member and said second valve member being arranged in said bore to face opposite to each other across said operating fluid channel, said first valve member and said second valve member being configured to slide away from and toward each other so as to respectively increase and reduce a cross-section of said operating fluid channel;

wherein said liner has an oil chamber formed behind each of said first valve member and said second valve member and configured to communicate with said high pressure chamber during generation of the impact torque so as to jointly and simultaneously push and slide both said first valve member and said second valve member against an urging force and thereby reduce said cross-section of said operating fluid channel as an operating fluid pressure in said high pressure chamber increases.

2. The impact torque adjusting device of claim 1, further comprising a spring arranged in said bore for continuously applying the urging force against said first valve member and said second valve member so as to urge both said first valve member and said second valve member in a direction to increase said cross-section of said operating fluid channel.

3. The impact torque adjusting device of claim 2, wherein said spring is located between said first valve member and said second valve member so as to continuously apply the urging force against said first valve member and said second valve member in a direction to move said first valve member and said second valve member away from each other and thereby increase said cross-section of said operating fluid channel.

* * * * *